United States Patent
Master et al.

(10) Patent No.: US 10,635,298 B2
(45) Date of Patent: Apr. 28, 2020

(54) SYSTEMS AND METHODS FOR LOCALIZING A USER INTERFACE BASED ON A PRE-DEFINED PHRASE

(71) Applicant: XEROX CORPORATION, Norwalk, CT (US)

(72) Inventors: Angom Pradeep Master, Imphal West (IN); Ashok Raj Anbalagan, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 369 days.

(21) Appl. No.: 15/490,128

(22) Filed: Apr. 18, 2017

(65) Prior Publication Data

US 2018/0300030 A1   Oct. 18, 2018

(51) Int. Cl.
*G06F 3/0488* (2013.01)
*G06F 17/27* (2006.01)

(52) U.S. Cl.
CPC ........ *G06F 3/04883* (2013.01); *G06F 17/275* (2013.01); *G06F 3/04886* (2013.01)

(58) Field of Classification Search
CPC . G06F 3/04883; G06F 17/275; G06F 3/04886
See application file for complete search history.

(56) References Cited

U.S. PATENT DOCUMENTS

| | | | |
|---|---|---|---|
| 2002/0154154 A1 | 10/2002 | Cornelius | |
| 2008/0244397 A1* | 10/2008 | Ferlitsch | H04N 1/0035 715/703 |
| 2012/0079376 A1 | 3/2012 | Grellmann et al. | |
| 2012/0086663 A1* | 4/2012 | Matsuo | G06F 3/04883 345/173 |
| 2014/0019905 A1* | 1/2014 | Kim | G06F 9/451 715/780 |
| 2014/0035823 A1* | 2/2014 | Khoe | G06F 3/02 345/171 |
| 2014/0172408 A1 | 6/2014 | Vukosavljevic et al. | |
| 2014/0215330 A1 | 7/2014 | Lee | |
| 2015/0205781 A1* | 7/2015 | Feng | G06F 17/275 704/9 |
| 2017/0068868 A1* | 3/2017 | Carbune | G06K 9/222 |
| 2017/0116184 A1* | 4/2017 | Bradley | G06F 17/289 |
| 2018/0081507 A1* | 3/2018 | Wengelnik | B60K 37/02 |
| 2018/0302520 A1 | 10/2018 | Anbalagan et al. | |

* cited by examiner

*Primary Examiner* — Matthew Ell
*Assistant Examiner* — Maria S Ayad
(74) *Attorney, Agent, or Firm* — Jones Robb, PLLC (57) ABSTRACT

The disclosure provides methods and systems for localizing a user interface of a multi-function device, the multi-function device is configured with a default language. The method includes receiving a pre-defined phrase from a user via the user interface of the multi-function device, the phrase is written in a local language of the user. Based on the received phrase, the phrase is analyzed to identify the local language of the user using one or more hand-written recognition techniques. Then, the local language is retrieved for presenting to the user. A language change option is presented to the user based on the identified local language of the user. Thereafter, the user interface is localized by changing the default language of the user interface to the local language. Finally, one or more options are presented to the user in the local language of the user.

16 Claims, 7 Drawing Sheets

SYSTEMS AND METHODS FOR LOCALIZING A USER INTERFACE BASED ON A PRE-DEFINED PHRASE

TECHNICAL FIELD

The presently disclosed embodiments are directed to user interfaces, and more particularly to systems and methods for localizing a user interface based on a pre-defined phrase.

BACKGROUND

Business devices such as a multi-function device, a photocopier machine, a scanning device, etc., allow users to perform various functions like printing, copying or scanning. With the advancement of technology, it has become a common practice in the consumer goods/appliances industries to manufacture such devices/products with configurations in languages based on geography or location where these devices are distributed, sold and/or operated. For example, if a consumer appliance (e.g., a photocopier machine) is intended to be distributed and/or sold in China, the consumer appliance is configured in Mandarin or Cantonese language. Similarly, if a consumer appliance is to be sold in Japan, the appliance is configured in Japanese language by default.

In this manner, it becomes easy for local people (i.e., people who understand Japanese language) to operate these devices but difficult for other users (users who don't understand or know Japanese language) to operate the same devices. For example, a person from United States of America goes to a particular location in Japan, where all such devices are configured in a native language of Japan and the person wishes to operate a scanning device. Here, the user may not able to operate the scanning device because he does not understand or well versed with the Japanese language. In such a scenario, the user has to rely on local users of that particular location who can easily understand the language configured in the scanning device or other similar devices.

At times, the business devices are configured with English language since it is the often language that people attempt to speak or read but still some users may not understand it properly, hence may not be able to operate the devices. Some solutions are available to change the language of the devices. For example, manufacturers provide options to select one or more preferred languages/known to operate the devices, however, those options involve knowing the devices by reading through manuals (e.g., booklets, or digital manuals), and manually select the language to operate the devices. The manual selection of language by the users may result in errors which in itself may lead to discomfort of the users in operating the devices. Thus, it is not a desirable option. Moreover, the manual selection seems a time consuming activity. Also, if the devices are already in a different language say, Japanese, then it is difficult to go to menu and change the language. Other available solutions include changing the language via voice feedback but it becomes difficult if a user is disabled or if the accent of the user is not very clear. In such cases, the voice feedback may not be helpful. In view of the above, there is a need for methods and systems to enable users to operate such devices with ease, for example, in their respective local language.

SUMMARY

According to embodiments illustrated herein, a method for localizing a user interface of a multi-function device is disclosed. The multi-function device is configured with a default language. The method includes receiving a pre-defined phrase from a user via a user interface of the multi-function device, the pre-defined phrase is written in a local language of the user. Based on the received phrase, the pre-defined phrase is analyzed to identify the local language of the user using one or more hand-written recognition techniques. The local language is retrieved for presenting to the user. A language change option is presented to the user based on the identified local language. The user interface is localized by changing the default language of the user interface to the local language. One or more options are presented to the user in the local language of the user.

According to further embodiments illustrated herein, a method for localizing a user interface is disclosed. The user interface is presented in a default language. The method includes receiving a pre-defined phrase from a user via the user interface of a device, the pre-defined phrase is written in a local language of the user. The pre-defined phrase is compared with one or more language patterns stored in a database. Based on the comparison, the local language of the user is identified. Then, the default language of the user interface is automatically changed to the local language, for performing one or more functions by the user.

According to additional embodiments illustrated herein, a multi-function device is disclosed. The multi-function device includes a user interface and a controller. The user interface is configured to receive a pre-defined hand-written phrase from a user, the phrase is written in a local language of the user, the user interface is presented in a default language. The controller includes a local language detection module, configured to: based on the received phrase, analyze the phrase to identify the local language of the user using one or more hand-written recognition techniques; retrieve the local language for presenting to the user; present a language change option to the user based on the identified local language; localize the user interface by changing the default language of the user interface to the local language; and present one or more options to the user in the local language of the user.

Other and further aspects and features of the disclosure will be evident from reading the following detailed description of the embodiments, which are intended to illustrate, not limit, the present disclosure

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Definitions

Definitions of one or more terms that will be used in this disclosure are described below without limitations. For a person skilled in the art, it is understood that the definitions are provided just for the sake of clarity, and are intended to include more examples than just provided below.

The term "device" refers to any electronic device that includes a processor/microcontroller and/or any other digital component, or a device or a system that performs one or more operations according to one or more programming instructions. Various examples of the device include, but are not limited to, a multifunction device, a printer, a scanner, a smart phone, a tablet computer, an e-reader device, a personal computer, a media player, a gaming device, a Set-Top-Box (STB) device, a Digital Video Recorder (DVR) device, a Global Positioning System (GPS) device, and a medical device. The device is configured with a pre-defined language based on geography or a location where the device is sold or distributed. The device executes a touch-based user interface. In the context of the current disclosure, the device is configured to detect a local language based on a pre-defined phrase provided via a user interface. For the sake of understanding, the disclosure will be discussed with multi-function device as an example without any limitation.

The term "multi-function device" refers to a device or a combination of multiple devices configured to perform one or more functions, but not limited to, scanning, printing, copying, imaging, and so forth. The multi-function device includes software, hardware, firmware, or combination thereof. The multi-function device is configured with a pre-defined language based on geography or a location where the multi-function device is sold or distributed. In the context of the current disclosure, the multi-function device is configured to detect a local language based on a pre-defined phrase provided via a user interface.

The "default language" is the language which the multi-function device is configured to operate, at the time of manufacturing. The default language is also called as a pre-defined or a pre-configured language of the multi-function device. For example, the default language of the multi-function device may be, but not limited to, English. The default language is dependent on geography or location where the multi-function device is sold or distributed.

The term "local language" refers to the language which is understood or known to the user, who wishes to operate the multi-function device. Further, the local language is determined based on the pre-defined phrase provided via a user interface. The local language may also be termed as the native language of the user.

The term "user interface" is defined to include an interface shown on the multi-function device and is operable by the user to perform one or more functions such as change setting, check status, initiate scan, print, fax, print, copy, or any other functions. The user interface allows the user to provide inputs related to printing, scanning, copying, etc. If the device is a mobile device, the user may perform functions related to email writing, sending messages or the like via the user interface.

The term "pre-defined phrase" is a text written by the user in his local language. The pre-defined phrase may relate to a function command such as print, scan, copy, or the like. While the pre-defined phrase may be any other text as input by the user. The pre-defined phrase may include one or more words.

The phrase "localization" refers to a process of customizing the user interface for a desired language by changing the default language of the multi-function device or the user interface.

Overview

Typically devices such as multi-function devices are manufactured such that the devices overall provide same kind of functionality to all users. But due to different languages adopted across the world, the manufacturers configure these devices in a default language, i.e., a language specific to a region, where these devices are sold or distributed. Most of the people are able to operate the device in a default language but some people (outside users or other users) may not be comfortable to operate the multi-function device in the default language. The same concerns are observed with other electronic devices such as mobile devices, PDAs, or the like. In order to enable such users to operate the multi-function device and other devices according to their comfort or languages known to them, the present disclosure is provided. The disclosure provides methods and systems for localizing a user interface based on a pre-defined phrase in a local language of a user, the pre-defined phrase is provided via the user interface of the device.

Exemplary Embodiments

Figure 1A:
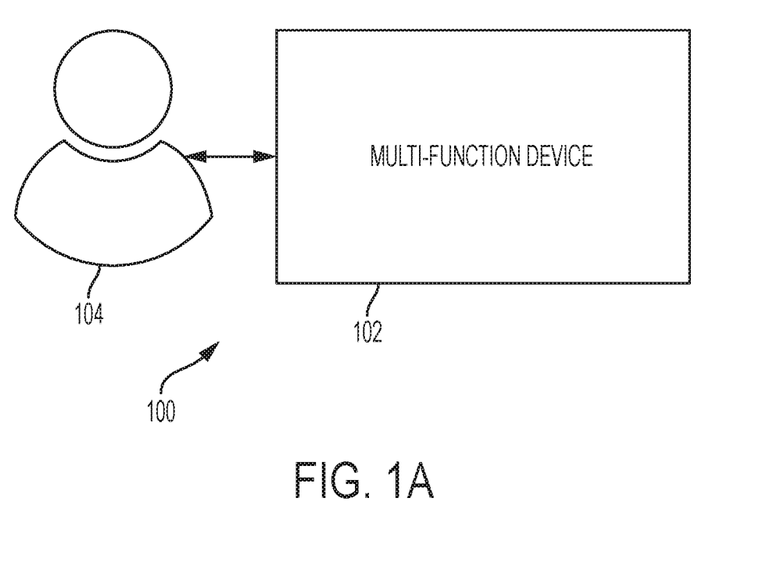
FIG. 1A illustrates an exemplary environment in which various embodiments of the disclosure can be practiced.

FIG. 1A is an exemplary environment 100 in which various embodiments of the disclosure can be practiced. The environment 100 includes a device 102 such as a multi-function device 102 and a user 104. Other examples of the device 102 without any limitation include a printer, a scanner, a smart phone, a tablet computer, an e-reader device, a personal computer, a media player, a gaming device, a Set-Top-Box (STB) device, a Digital Video Recorder (DVR) device, a Global Positioning System (GPS) device, and a medical device. For easy discussion, the disclosure is discussed with respect to the multi-function device 102, but it is understood that the disclosure may be implemented for any such equivalent device or a device having a user interface. The multi-function device 102 may include one or more additional components to implement the current disclosure, i.e., to localize the user interface.

The user 104 operates or uses the multi-function device 102 for his day-to-day tasks such as printing, copying, imaging, scanning, or a combination of these. The multi-function device 102 is configured to operate in a default/pre-defined language. The pre-defined language is based on a geography where the multi-function device 102 is distributed or sold. For example, if there is a multi-function device 102 in the United States, the multi-function device 102 is operable in English language. In another example, if the multi-function device 102 is sold in Japan, the multi-function device 102 is configured in Japanese language.

In the context of the present disclosure, the multi-function device 102 localizes the user interface of the multi-function device 102 based on a pre-defined hand-written phrase. The pre-defined phrase is provided by the user 104 via the user interface of the multi-function device 102. The user interface is a touch based interface, the pre-defined phrase may be provided via a touch stylus, pen, finger, hand or other mechanisms. The pre-defined phrase may be a function command such as print, scan, copy, fax, etc. Here the user 104 is trained or informed initially regarding the feature of localizing the user interface by scribbling the pre-defined phrase on the user interface. The feature may be also summarized and put as a label on the multifunction device 102 so that the user 104 becomes aware of the feature and able to use the same. Based on the pre-defined phrase, the multi-function device 102 identifies the local language of the user 104 and changes the default language to the local language of the user 104.

Figure 1B:
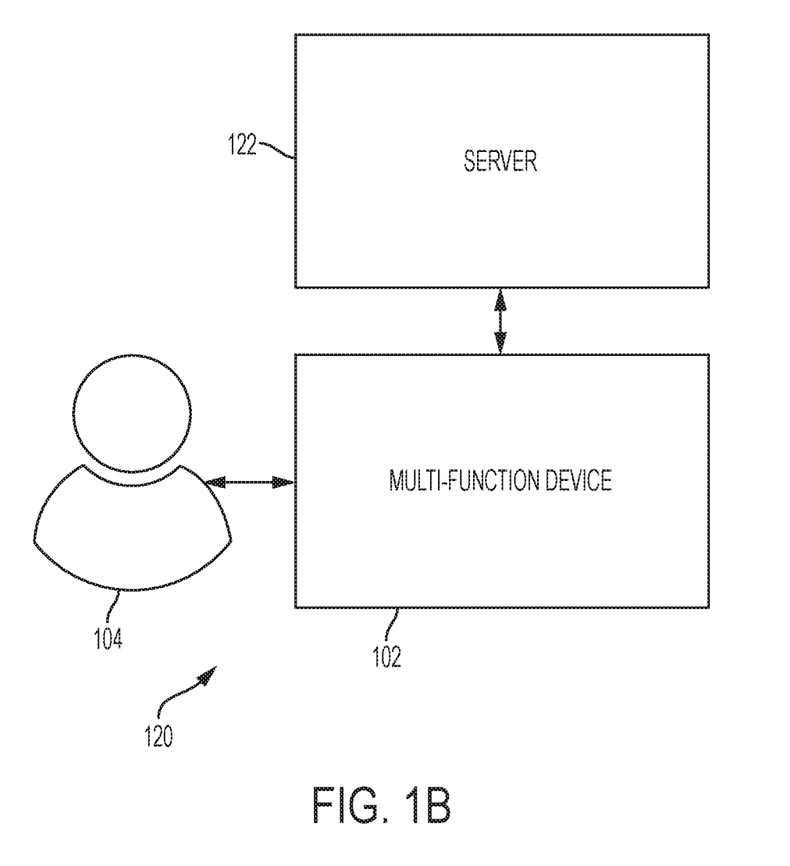
FIG. 1B illustrates another exemplary environment in which various embodiments of the disclosure can be practiced.

In FIG. 1A, the language detection part is performed by the multi-function device 102 itself, however in other embodiments the language detection part may be performed by an external device such as a server as discussed in FIG. 1B. In other words, all the functionalities are performed by a single standalone device such as the multi-function device 102 as depicted in FIG. 1A.

FIG. 1B shows another exemplary environment 120 in which various embodiments of the disclosure may be practiced. As shown, the environment 120 includes the multi-function device 102 and an external device 122 connected to the multi-function device 102 over a network (not shown). In this particular embodiment, a part of functionalities are performed at the multi-function device 102, while other functionalities are performed by the external device 122. Specifically, the language detection functionality is performed by the external device 122. Various examples of the external device 122 include, but not limited to, a server such as a web server, a data server, an external storage, a cloud system, a desktop PC, a notebook, a portable computer, a workstation, a mainframe computer, an internet appliance, or the like.

The network may be a wireless network, a wired network, or a combination thereof. The network may also be an individual network or a collection of many such individual networks, interconnected with each other and functioning as a single large network, e.g., the Internet or an intranet. The network may be implemented as one of the different types of networks, such as intranet, local area network (LAN), wide area network (WAN), the internet, near field communication (NFC), and such. The network may either be a dedicated network or a shared network, which represents an association of the different types of networks that use a variety of protocols. Further, the network may include network devices, such as network switches, hubs, routers, HBAs, for providing a communication link between the multi-function device 102 and other connected devices/systems.

Operational and structural details of the multi-function device 102 remain the same as discussed above in FIG. 1A and thus, will be discussed very briefly in FIG. 1B. In the embodiment of FIG. 1B, the multi-function device 102 receives the pre-defined phrase via the user interface and sends the pre-defined phrase to the external device 122 (also referred to as server) for further processing. The external device 122 receives the pre-defined phrase from the multi-function device 102.

As shown here in FIG. 1B, the external device 122 receives the pre-defined phrase and analyzes the pre-defined phrase to identify the local language. The external device 122 extracts a portion of the text information using various character recognition techniques to identify the local language. Other hand-written recognition techniques may also be implemented to identify the local language. Once identified, the local language information is transmitted to the multi-function device 102. As a result, the multi-function device 102 changes the default language of the user interface to the identified local language.

In one example, matrix matching may be implemented for language detection. The matrix matching includes comparing an image of the character on a pixel-by-pixel basis (i.e., Pattern Matching) with the standard set of all the languages. The match with maximum hit for a language is considered as the language of the text being under OCR process. In another example, feature extraction may be implemented for language detection. In this extraction method, features like closed loops, line direction are used to identify the character. These information are compared against a standard set of all languages. In some examples, a combination of matrix matching and feature extraction may be used for language detection.

For a person skilled in the art it is understood that the language detection techniques as mentioned are exemplary and other techniques as known or developed later may be implemented without limiting the scope of the disclosure.

Figure 2:
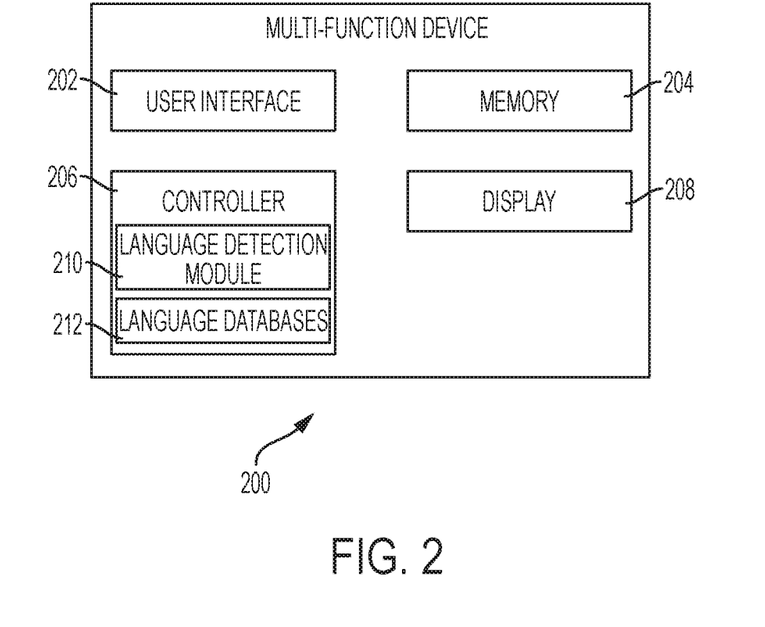
FIG. 2 illustrates an exemplary system having one or more components for localizing a user interface.

FIG. 2 illustrates an exemplary device 200 for localizing a user interface of a device. Examples of the device 200 include, but are not limited to, a multifunction device, a printer, a scanner, a smart phone, a tablet computer, an e-reader device, a personal computer, a media player, a gaming device, a set-top-box (STB) device, an ATM, a Self-Operating Ticket Booking Counter, a digital video recorder (DVR) device, a Global Positioning System (GPS) device, and a medical device.

The device 200 includes a user interface 202, a memory 204, a controller 206 and a display 208. The controller 206 further includes a language detection module 210 (also referred to as local language detection module 210) and one or more language databases 212. Each of the components 202, 204, 206 and 208 are connected to each other via a communication bus or a later developed protocols. Further, each of the components 202, 204, 206 and 208 coordinate with each other for localizing the user interface 202 of the device 200.

The device 200 is the one which is typically used by the user for his day-to-day tasks. For example, if the user uses a device for sending or receiving messages, then the device may be a smart phone. In another example, if the user uses a device for printing, scanning or related functions, then the device may be a multi-function device. For simplicity, the disclosure is explained with the multi-function device as an example, but it is understood that the disclosure may be implemented for other types of devices as mentioned above.

The user interface 202 allows the user to access the device 200 to perform one or more functions. The user interface 202 is a touch-sensitive interface. The user interface 202 allows the user to provide an input for localizing the user interface. The input includes a pre-defined hand-written phrase, the pre-defined phrase indicates a function command. For example, the phrase may be "print," "scan," "copy," or a combination of these. The input may be provided via a stylus, light pen, finger, mac magic touch, or others. The pre-defined phrase is written in a local language of the user.

The display 208 allows the user to view details or functions related to the multi-function device 200. The display 208 may be a touch-sensitive display and may act as an input device. The display 208 may be a liquid crystal display, or any other type of display commonly used in the device 200.

The memory 204 stores the pre-defined phrase as received from the user. The memory 204 further stores one or more languages related to the user. At least one language of the one or more languages is the local language of the user. Various examples of the languages include, but not limited to, Spanish, French, Chinese, Japanese, English, Hindi, Kannada, or the like. The memory 204 generally includes both volatile memory (e.g., Random Access Memory (RAM)) and non-volatile memory (e.g., Read Only Memory (ROM), Flash Memory, or the like). The memory 204 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes.

The controller 206 receives the pre-defined phrase from the user interface 202 and passes the pre-defined phrase to the local language detection module 210. The language detection module 210 analyzes the pre-defined phrase. To this end, the local language detection module 210 extracts one or more characters of the pre-defined phrase to identify the local language. The local language detection module 210 is trained with many characters from various languages. The local language detection module 210 may include an Optical Character Recognition (OCR) engine to identify the local language. In some embodiments, the local language detection module 210 compares the pre-defined phrase with one or more language patterns as stored in the memory 204 or with the language databases 212. Based on the comparison, the language detection module 210 identifies the local language of the user. In additional embodiments, the local language is identified using one or more hand-written recognition techniques based on various language models. Few examples of the language models are probabilistic models, neural network models, or a combination of these.

Once identified, the controller 206 checks whether the default language of the multi-function device 200 is different from the local language of the multi-function device 200. If the default language is same as that of the local language, then no change in the default language is needed. In case the default language is different from that of the identified local language, the controller 206 checks for the local language availability with the multi-function device 200. Based on the availability, the controller 206 retrieves the local language and automatically changes the default language to the local language of the user. In some embodiments, the controller 206 displays a language change option (i.e., a pop up message) to the user via the user interface 202. The option is displayed to change the default language to the local language. The user confirms the language change option and the default language is changed to the local language. Once the user interface 202 is shown in the local language, the user then performs functions related to scanning, printing, copying and others.

If the local language is not available with the multi-function device 200, the multi-function device 200 contacts a server for downloading the local language from the server. The downloaded local language is then installed/configured on the multi-function device 200.

In some embodiments, when the user inputs a character via the user interface 202 for localization, then the character may be recognized automatically by the multi-function device 200/the controller 206 with or without waiting for a second character from the user. Upon recognition, the controller 206 changes the default language to the local language of the user.

Figure 3A:
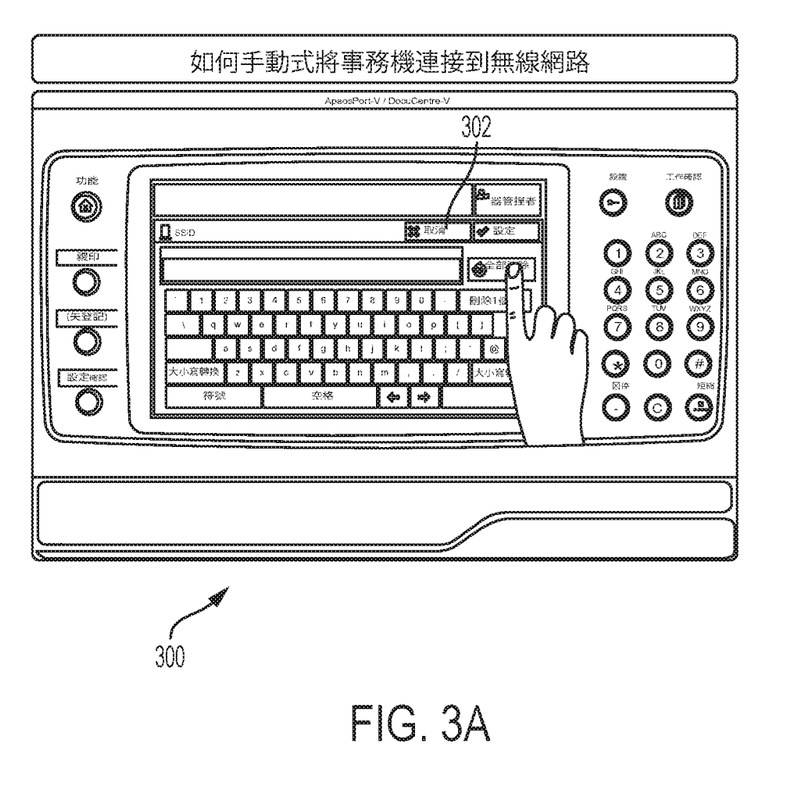
FIGS. 3A-3C illustrate exemplary user interfaces of a multi-function device.
Figure 3B:
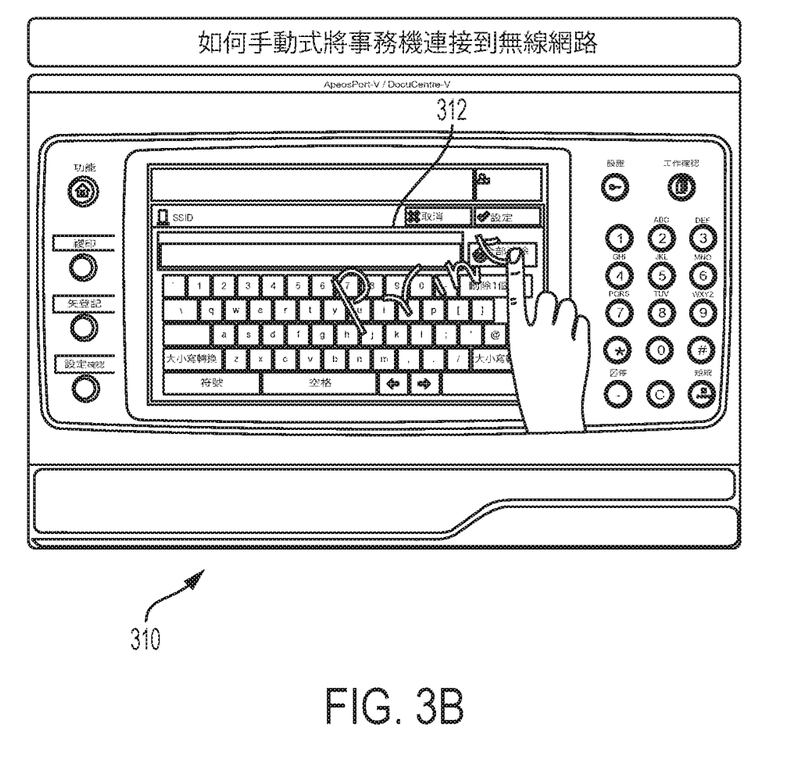
Figure 3C:
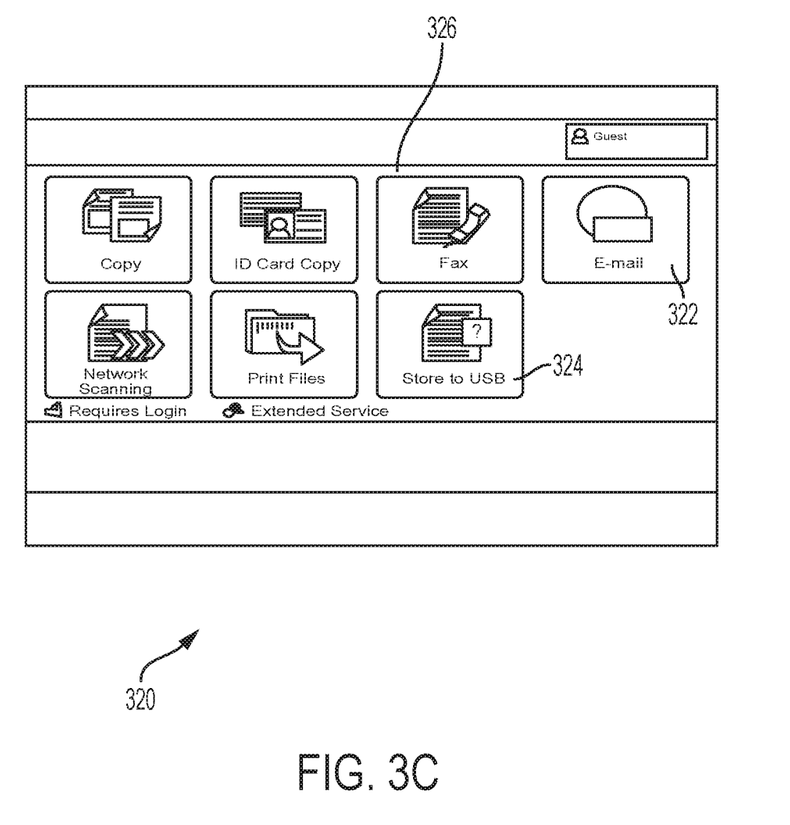

FIGS. 3A-3C illustrate exemplary snapshots of a user interface of a multi-function device. The snapshot 300 shows a default/display language of the device is Chinese (marked as 302). If the user wishes to localize the user interface, the user writes a pre-defined phrase such as 312 as shown in the snapshot 310 of FIG. 3B. The user scribbles/traces the phrase 'Print' 312 on the user interface using his finger. The device identifies the language of the phrase 312 and automatically all menu options such as 322, 324, and 326 are displayed to the user in the local language of the user as shown in the snapshot 320 of FIG. 3C.

Figure 4:
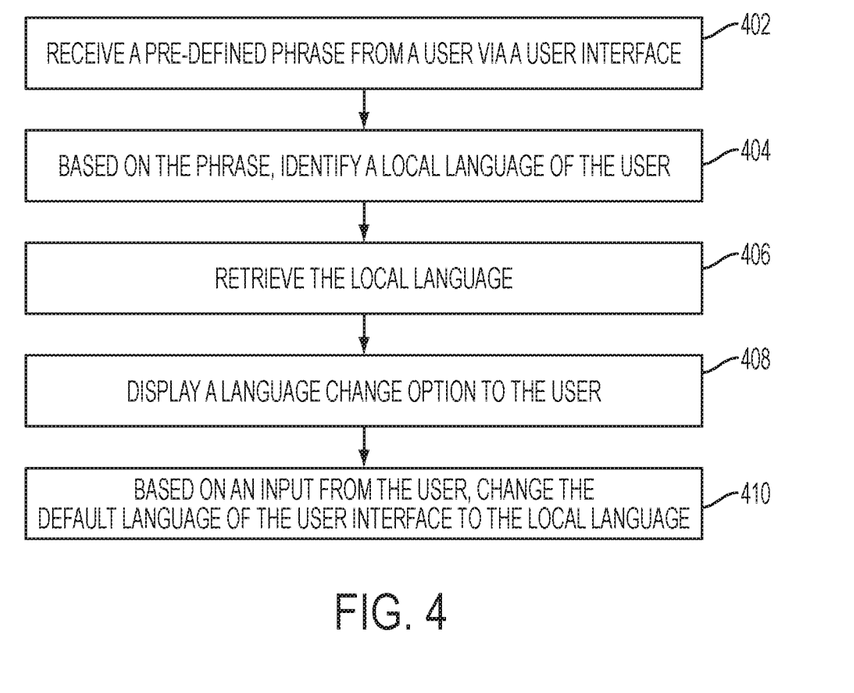
FIG. 4 is a flowchart illustrating a method for localizing a user interface, in accordance with an embodiment.

FIG. 4 is a flowchart illustrating a method of localizing a user interface of a device such as a multi-function device, in accordance with an embodiment.

It is considered that a user wishes to use the multi-function device for scanning, printing, or the like. But the displayed language of the multi-function device is the language which is not understood by the user or the user may not be able to operate the device using the displayed language. For example, the user interface displays various menu options and a touch-based keypad in a language (e.g., Chinese) which the user may not be able to understand. Hence, the user wishes to change the default language to in his preferred language (e.g., English) to execute the desired operation/function.

At 402, a pre-defined phrase is received from the user via the user interface of the device. The pre-defined phrase relates to a function command such as "print," "scan," "copy," "form fill," etc. The phrase is written by the user in his local language such as Hindi, English, Chinese, French, Japanese, or the like. While the pre-defined phrase may be any phrase in a local language of the user. At 404, based on the pre-defined phrase, the local language is identified using one or more hand-written recognition techniques. After identifying, the local language is retrieved at 406. The local language is retrieved from the multi-function device if available with the multi-function device or from an external server. At 408, a language change option is displayed to the user via the user interface. The user selects the local language change option to the user. At 410, based on the selection from the user, the default language of the multi-function device is changed to the local language of the user. As a result, all menu options are displayed to the user in his local language. Finally, one or more functions are performed by the user such as printing, scanning, form filling or the like, using the local language of the user.

In embodiments, where the local language is not available with the multi-function device or with the server, the multi-function device displays related language which may be known to the user. For example, if the identified local language Hindi is not available with the multi-function device or with the server, the multi-function device displays other related languages such as Punjabi, Kannda, or English for the user. The user can choose a language to operate the multi-function device.

The flowchart is discussed from the perspective of the multi-function device. The method flowchart or the steps of the flowchart are executed by the multi-function device or various components of the device as discussed above in FIG. 2. Further, the disclosure may be implemented for any electronic devices having a user interface screen.

The disclosure discloses methods and systems for localizing a user interface of a device such as multi-function device, based on a pre-defined text or phrase from a user. Localizing the user interface based on hand-written language includes a new ease-of-use methodology that enhances user experience and satisfaction. The disclosure provides a smart way to customize the language of the user interface of the device to improve operability. Further, the implementation of the disclosure does not require any hardware changes to the existing devices. The disclosure can also be implemented for differently abled people who can change the user interface to their convenient language. The disclosure allows the user to change the language to their native language without much interaction with the device and also allows the user having less knowledge on other language to change the language of the device.

For a person skilled in the art, it is understood that the use of phrase(s) "is," "are," "may," "can," "could," "will," "should" or the like is for understanding various embodiments of the present disclosure and the phrases do not limit the disclosure or its implementation in any manner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "analyzing," or "retrieving," or "displaying," or "recognizing," or "identifying," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for localizing a user interface of a multi-function device, the method comprising:
   receiving a functional hand-written text entry from a user via a user interface of a display of the multi-function device, the functional text entry is hand-written in a second language that differs from a first language, the user interface set to the first language prior to receiving the functional hand-written text entry;
   based on the received functional hand-written text entry, analyzing the functional text entry to identify the second language using one or more hand-written recognition techniques;
   localizing the user interface by automatically resetting the user interface to the second language or to a third language; and
   presenting one or more functional options to the user in the second or third language,
   wherein the functional hand-written text entry and the one or more functional options are directed to one or more functions for which the multi-functional device is configured to perform, and the user interface is localized to the third language if the second language is not available.

2. The method as claimed in claim 1, wherein the user interface is a touch-sensitive interface.

3. The method as claimed in claim 1, wherein the receiving comprises scribbling the functional hand-written text entry on the user interface by the user.

4. The method as claimed in claim 1, further comprising:
   downloading the second or third language from a server; or
   installing the second or third language on the multi-function device, or both.

5. The method as claimed in claim 1, wherein the one or more functions comprises one or more of printing, scanning, copying, faxing, imaging, and form filling.

6. The method as claimed in claim 1, wherein the multi-functional device is configured to perform two or more of printing, scanning, copying, faxing, imaging, and form filling.

7. A method for localizing a user interface, the user interface is presented in a first language, the method comprising:
   receiving a functional hand-written text entry from a user via the user interface on a display of a device, the functional hand-written text entry is written in a second language;
   comparing the functional hand-written text entry with one or more language patterns stored in a database;
   based on the comparison, identifying the second language; and
   automatically resetting the user interface to the second language,
   wherein the functional hand-written text entry is directed to one or more functions for which the device is configured to perform.

8. The method as claimed in claim 7, wherein the one or more functions relate to printing, scanning, copying, faxing, imaging, and form filling.

9. The method as claimed in claim 7, wherein the device comprises one or more of a multi-function device, a printer, a scanner, a copier, a fax machine, a mobile device, a computing device, a laptop, a mobile device, a hand-held device, a tablet computer, an e-reader device, a personal computer, a media player, a gaming device, a set-top-box (STB) device, a digital video recorder (DVR) device, a Global Positioning System (GPS) device, and a medical device.

10. The method as claimed in claim 7, wherein the device is a multi-functional device.

11. A multi-function device, comprising:
    a user interface on a display configured to receive a hand-written functional text entry from a user, the functional hand-written text entry is written in a second language, the user interface set to a first language prior to receiving the functional hand-written text entry; and
    a processor configured to:
      based on the received functional hand-written text entry, analyze the functional hand-written text entry to identify the second language of the user using one or more hand-written recognition techniques;
      localize the user interface by automatically resetting the user interface to the second language or to a third language; and
      present one or more functional options to the user in the second or third language,
      wherein the functional hand-written text entry and the one or more functional options are directed to one or more functions for which the multi-functional device is configured to perform, and the user interface is localized to the third language if the second language is not available.

12. The multi-function device as claimed in claim 11, further comprises a memory configured to store one or more language patterns.

13. The multi-function device as claimed in claim 11, wherein the user interface is a touch-sensitive interface.

14. The multi-function device as claimed in claim 11, wherein the processor is further configured to:
    download the second or third language from a server; or
    install the second or third language on the multi-function device; or both.

15. The multi-function device as claimed in claim 11, wherein the one or more functions comprises one or more of printing, scanning, copying, faxing, imaging, and form filling.

16. The multi-function device as claimed in claim 11, wherein the multi-functional device is configured to perform two or more of printing, scanning, copying, faxing, imaging, and form filling.

* * * * *